United States Patent [19] | [11] 4,238,432
Henderson et al. | [45] Dec. 9, 1980

United States Patent [19]

[11] 4,238,432

[45] Dec. 9, 1980

[54] EXTRUSION PRESSES

[75] Inventors: John A. Henderson; Raymond H. Lindley, both of Bristol; Keith B. Whiteley, Basingstoke, all of England

[73] Assignee: Internationale Octrooi Maatschappij, Rotterdam, Netherlands

[21] Appl. No.: 35,782

[22] Filed: May 3, 1979

[51] Int. Cl.[3] .......................... B29F 3/012; B29F 3/06

[52] U.S. Cl. .................................. 264/40.7; 264/141; 264/142; 264/310; 425/145; 425/154; 425/164; 425/308

[58] Field of Search ..................... 264/40.1, 40.7, 142, 264/141, 310; 425/154, 145, 164, 308

[56] References Cited

U.S. PATENT DOCUMENTS

| | | | |
|---|---|---|---|
| 2,020,510 | 11/1935 | Meakin | 425/154 |
| 2,178,009 | 10/1939 | Helm | 425/154 |
| 2,240,660 | 5/1941 | Meakin | 425/154 |

*Primary Examiner*—Jeffery R. Thurlow
*Attorney, Agent, or Firm*—Barry Kramer

[57] ABSTRACT

An extrusion press particularly for forming animal feed pellets is provided with means for detecting slip between the roll and the die and the operating conditions, e.g. feed of material to the nip, are varied when the slip exceeds a predetermined value or the rate of change of slip exceeds or corresponds to a predetermined value.

8 Claims, 3 Drawing Figures

EXTRUSION PRESSES

Figure 1:
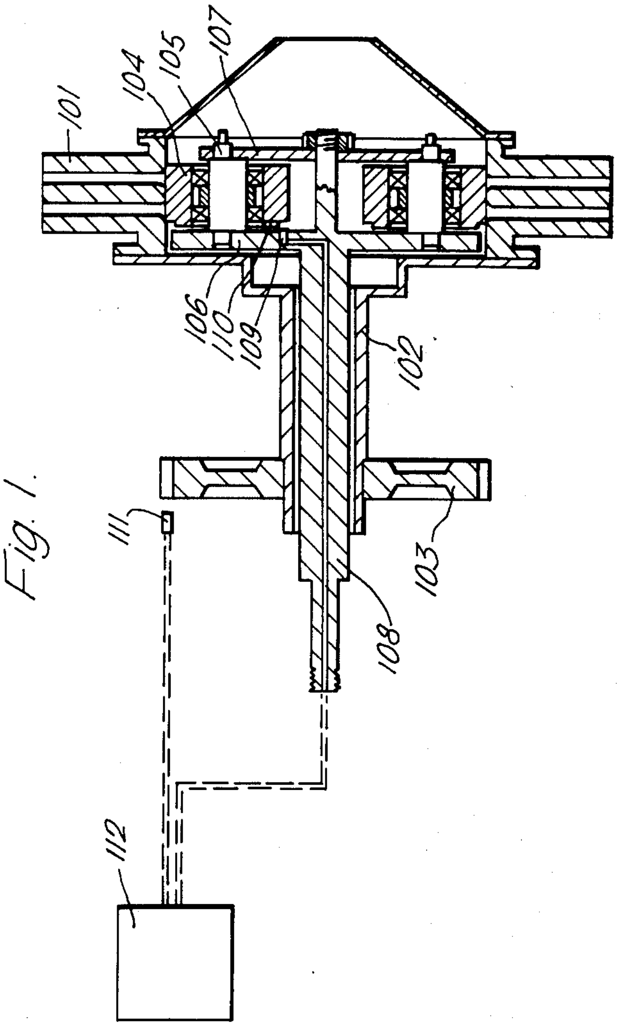

The present invention relates to extrusion presses, particularly for forming animal feed pellets.

Extruded animal feeds are commonly produced on presses consisting of a cylindrical die containing extrusion orifices in the form of holes drilled more or less radially to the die cylinder and of a diameter corresponding to the required product size. One press roll, or more, independently mounted and capable of being moved into close contact with the inner surface of the die is driven by friction by rotation of the die. Feed material to be extruded, normally heated by open steam to a moist, slightly plastic consistency is fed into the die and is forced through the orifices when nipped between press roll and die. The extruded product is cut or broken off to the required length as it emerges from the outer surface of the die. Variants exist in which a free running die is frictionally driven by directly driven press rolls or in which the die is a flat disc and the press rolls travel in an annular path.

A basic problem in the operation of such presses is that they are liable to block, choke or flood which may necessitate plant shutdown to remove material in the nip of the press rolls or even removal of the die so that each hole can be individually cleared. Press blockages are generally associated with high feed temperatures, high levels of sticky components such as molasses and/or excessive rates of feed but the critical conditions vary from formulation to formulation. The requirements of the industry are such that only short production runs are usually carried out on any given formulation, and therefore the optimum balance of conditions is continually having to be varied.

Operators rely very much on subjective assessment of feed conditions and in order to avoid blocking or choking tend to run the press at "safe" working conditions which may be a long way from the optimum in relation to product quality or to the rate of output.

We have found that slip between the die and roll increases with, for example, increasing rates of feed of material to the nip. Depending on the particular nature, temperature, composition etc. of the material the actual slip occurring at certain rates of feed will be different as will be the rate of change of slip with increasing rates of feed. Nevertheless we have found that for a particular set of operating conditions there is a value for the slip, or rate of change of slip, which if exceeded is liable to lead to blockages. Generally the slip at low feed rates increases approximately linearly with increase of rate of feed but as the rate of feed increases the slip increases more rapidly, i.e. the rate of change of slip increases. Whilst there is no sharp change from a linear increase in slip with increased feed rate, the onset of the more rapid change of slip may be about the optimum rate of feed.

The present invention provides a method of extruding a material comprising feeding the material into the nip between a press roll and a die having extrusion orifices through which the material is forced, positively driving either one of said roll or die, thereby causing the other of said roller die to rotate, detecting slip between the roll and die and varying the feed of material to the nip when the slip corresponds to a predetermined value or when the rate of change of slip corresponds to a predetermined value.

Thus by detecting the slip, control of the operation of the extrusion press can be improved. The feed of material to the nip can be varied by stopping or reducing the rate of feed or by varying its temperature composition or other parameters.

The slip between the roll and die can be detected by obtaining electrical signals proportional to the peripheral speeds of the roll and die and feeding the signals to a comparator. The comparator can produce an output signal which initiates an audio and/or visual alarm when the slip or rate of change of slip corresponds to the predetermined value. Alternatively the comparator can produce an output signal which is used as a feedback control to control the feed of material to the nip between the roll and die.

The invention also provides a roll die extrusion press comprising a rotary die carrying a plurality of extrusion orifices; at least one press roll which is arranged to rotate in frictional engagement with the rotary die to force material through the extrusion orifices; the drive means for rotating the die and press roll, one directly and the other via the frictional engagement; and measuring means associated with the press roll and the die for detecting slip between roll and die and a comparator adapted to provide an output signal related to the slip in response to signals from the measuring means.

The measuring means can be adapted to provide an output signal related to the rate of change of slip between roll and die.

The measuring means is conveniently provided by proximity detectors for sensing the rotation of the roll and die and a comparator adapted to receive the output signals from the detectors and provide a comparator output signal dependent on the slip.

As previously mentioned the rotary die will generally be cylindrical although circular disc shaped dies are also used, and the invention is equally applicable to these. Also, in regard to drive, while the die will generally be directly driven and the roll will be driven via the frictional engagement, the converse is also possible.

Three examples of the invention will now be described with reference to the three accompanying diagrammatic figures.

EXAMPLE 1

A system installed on a production press for animal feed pellets is shown in FIG. 1. This type of press is typical of a very large number of designs in commercial use.

The die 101, carrying rows of extrusion orifices in a cylindrical location, is clamped to a back plate at the end of a hollow quill shaft 102 which is driven through a main drive gear wheel 103. Hollow press rolls 104 are supported by suitable bearings on eccentrically mounted roll support shafts 105. Means, not shown, are installed to provide for a small arc of rotation of the roll support shaft 105 and thus permit adjustment to the clearance between the die 101 and the press rolls 104. The roll support shafts 105 are carried on a back plate 106 and a front carrier 107 mounted at the end of a stationary shaft 108, installed within the hollow quill shaft 102.

Information on the rotational speed of one of the press rolls 104 is provided by first measuring means comprising a proximity detector 109 mounted in the back plate 106. The proximity detector 109 emits a pulse each time a slot 110 cut in the end of the roll shell 104 passes close to the detector. Access for the electrical connections to the proximity detector 109 were obtained by suitably modifying existing grease channels in the shaft 108. The information on the die speed is obtained from a second measuring means comprising a proximity detector 111 mounted closely adjacent to the teeth of the main drive gear wheel 103. The proximity detector 111 emits pulses related to the number of teeth and to the rotational speed of the main drive gear wheel 109.

The signals from the two measuring means are electronically combined in comparator 112, taking into account the number of teeth on the main drive gear wheel 103, the inner circumference of the die 101 and the outer circumference of the roll shell 104 so that an electrical output is obtained related to % roll slip where, if $V_D$ is the speed of the inner surface of the die and $V_R$ is the peripheral speed of the outer surface of the roll shell then % roll slip equals $(1-V_R/V_D)\times 100$.

When the value of this output signal corresponds to slip beyond a predetermined value the signal can initiate a "switch-off" alarm having an audio and/or visual display or form the basis of a feedback control. Alternatively the comparator can provide an output signal corresponding to the rate of change of slip, which output signal is then used as above when it corresponds to a rate of change of slip beyond a predetermined value.

When the alarm is actuated the feed of material to the nip must be varied to bring operation of the press back to the predetermined level. Clearly for maximum press utilisation the predetermined operating level of the press should be approaching the optimum with the result that actuation of the alarm signals imminent blockage. There may be reasons for otherwise running a press but the alarm nevertheless signals a departure from the predetermined level.

Varying the feed is conveniently affected by varying the rate of feed of material when the alarm is actuated. Alternatively the output signal from the comparator can actuate a feedback control of the rate of feed of material and other process conditions such as the amount of steam heating or the components of the feed material.

EXAMPLE 2

Figure 2:
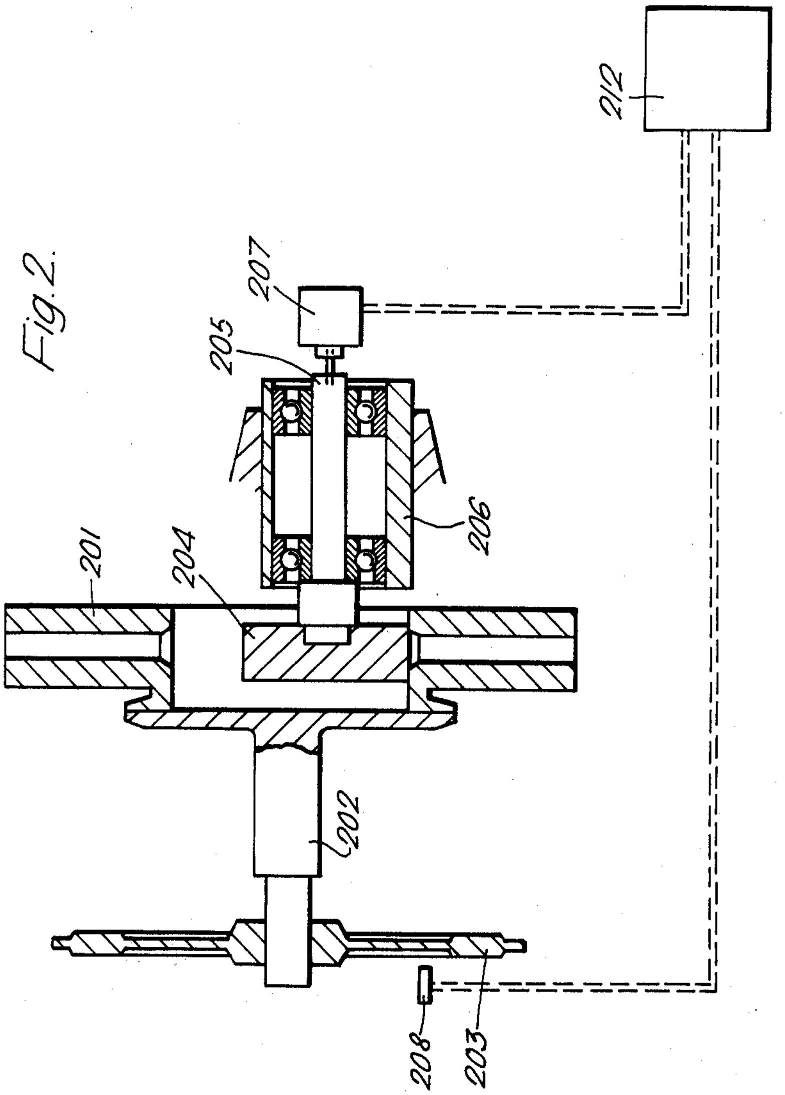

A system installed on a laboratory press is shown in FIG. 2. In this press the die 201 carries a single row of extrusion orifices and is clamped to a back plate at the end of the main drive shaft 202 which is driven by a chain sprocket 203. A solid press roll 204 is attached directly to a support shaft 205 mounted in suitable bearings in an eccentrically bored sleeve 206 located in the front cover of the press. Provision is made for slight rotation of the eccentric sleeve 206 in its housing so as to adjust the clearance between the press roll 204 and the die 201.

Information on the speed of the roll 204 is provided by first measuring means consisting of a tacho-generator 207 which is driven by the roll shaft 205 and produces an electrical signal related to its rotational speed. Information on the speed of the die is derived from second measuring means consisting of a proximity detector 208 mounted close to the chain sprocket 203 and emitting pulses at a rate determined by the number of spokes on the sprocket 203 and its rotational speed.

The electric signals from the tacho-generator 207 and the proximity detector 208 are combined in comparator 212 to provide an output signal as in Example 1.

EXAMPLE 3

Figure 3:
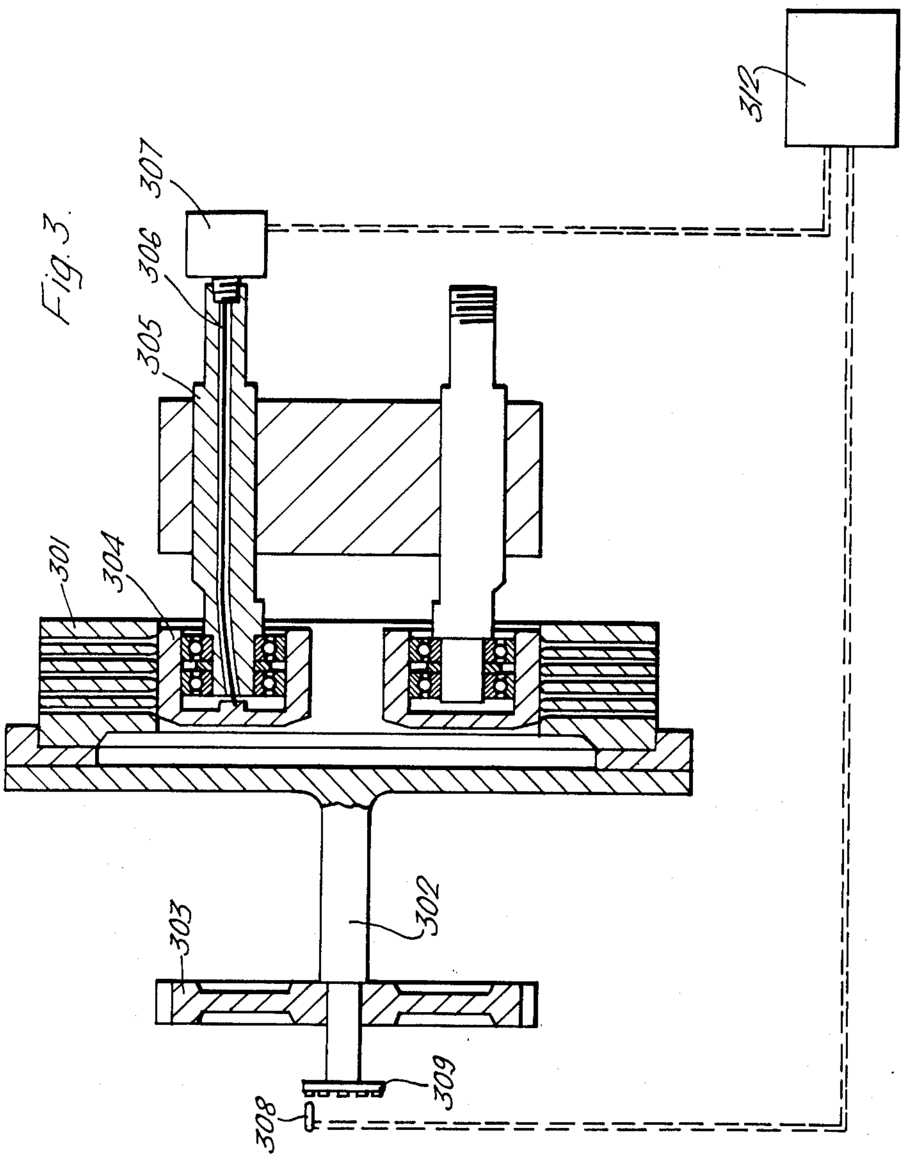

A system installed on a large production press is shown in FIG. 3. The die 301 carrying rows of orifices is bolted to a back plate carried at the end of the main drive shaft 302 which is driven by the main drive gear wheel 303. A number of hollow press rolls 304 are supported by suitable bearings on an eccentric section of roll support shafts 305 which are mounted on the external frame of the press. Means, not shown, are installed to provide for a small arc of movement of the shafts to permit adjustment of the clearances between the die 301 and the press rolls 304.

Information on the rotational speed of one of the rolls is transmitted by first measuring means consisting of a socket fastened at the centre of the end cap of the press roll 304 and feeding via a flexible cable drive 306 to a tacho-generator 307 mounted on the end of the roll support shaft 305. Access for the flexible cable drive 306 was obtained by modifying grease channels existing within the roll support shaft 305. Information on the speed of the die is obtained from the output of second measuring means consisting of a proximity detector 308 mounted closely adjacent to a keep plate 309 fastened to the end of the main drive shaft 302 (first measuring means). Metal studs, mounted in the keep plate 309 at equal spacings result in the proximity detector 308 emitting a pulsed signal relating to the speed of the main drive shaft 302 and the die 301 and to the number of studs in the keep plate 309.

The electric signals from the tacho generator 307 and the proximity detector 308 are suitably combined in comparator 312 to provide an output signal as in Examples 1 and 2.

What is claimed is:

1. A method of extruding material through an extrusion press comprising feeding the material into the nip between a press roll and a die having extrusion orifices through which the material is forced, positively driving either one of said roll or die, thereby causing the other of said roll or die to rotate, detecting slip between the roll and die and varying the feed of material to the nip when the slip or the rate of change of slip corresponds to a predetermined value which, if exceeded, leads to blockage of said press.

2. A method of extruding a material according to claim 1 in which the slip between the roll and die is detected by obtaining electrical signals proportional to the peripheral speeds of the roll and die and feeding the signals to a comparator.

3. A method of extruding a material according to claim 2 in which the comparator produces an output signal which initiates an audio and/or visual alarm when the slip or rate of change of slip corresponds to the predetermined value.

4. A method of extruding a material according to claim 2 in which the comparator produces an output signal which is used as a feedback control to control the feed of material to the nip between the roll and die.

5. A method according to any of the preceding claims in which the feed of material is varied by stopping the feed of material.

6. A roll extrusion press comprising a rotary die carrying a plurality of extrusion orifices; at least one press roll which is arranged to rotate in frictional engagement with the rotary die to force material through the extrusion orifices; drive means for rotating the die and press roll, one directly and the other via the frictional engagement; and measuring means associated with the press roll and the die for detecting slip between the roll and die by obtaining signals proportional to the peripheral speed of said roll and die and a comparator adapted to receive said signals from said measuring means and to provide a output signal related to the slip or rate of change of slip in response to said signals from the measuring means thereby enabling regulation of the operating conditions when a predetermined value is reached to eliminate blockage of the press.

7. Apparatus according to claim 6 in which the measuring means is adapted to provide an output signal related to the rate of change of slip between roll and die.

8. Apparatus according to claim 6 in which the measuring means comprises proximity detectors for sensing the rotation of the roll and die and a comparator adapted to receive the output signals from the detectors and provide a comparator output signal dependent on the slip.

* * * * *

UNITED STATES PATENT AND TRADEMARK OFFICE
CERTIFICATE OF CORRECTION

PATENT NO. : 4,238,432
DATED : December 9, 1980
INVENTOR(S) : John A. Henderson et al It is certified that error appears in the above—identified patent and that said Letters Patent is hereby corrected as shown below:

The identification of the assignee should read as follows:

[73] Assignee: Internationale Octrooi Maatschappij "OCTROPA" B.V.
Rotterdam, The Netherlands

Signed and Sealed this

*Twenty-fourth* Day of *March 1981*

[SEAL]

*Attest:*

RENE D. TEGTMEYER

*Attesting Officer* *Acting Commissioner of Patents and Trademarks*